Patented May 19, 1942

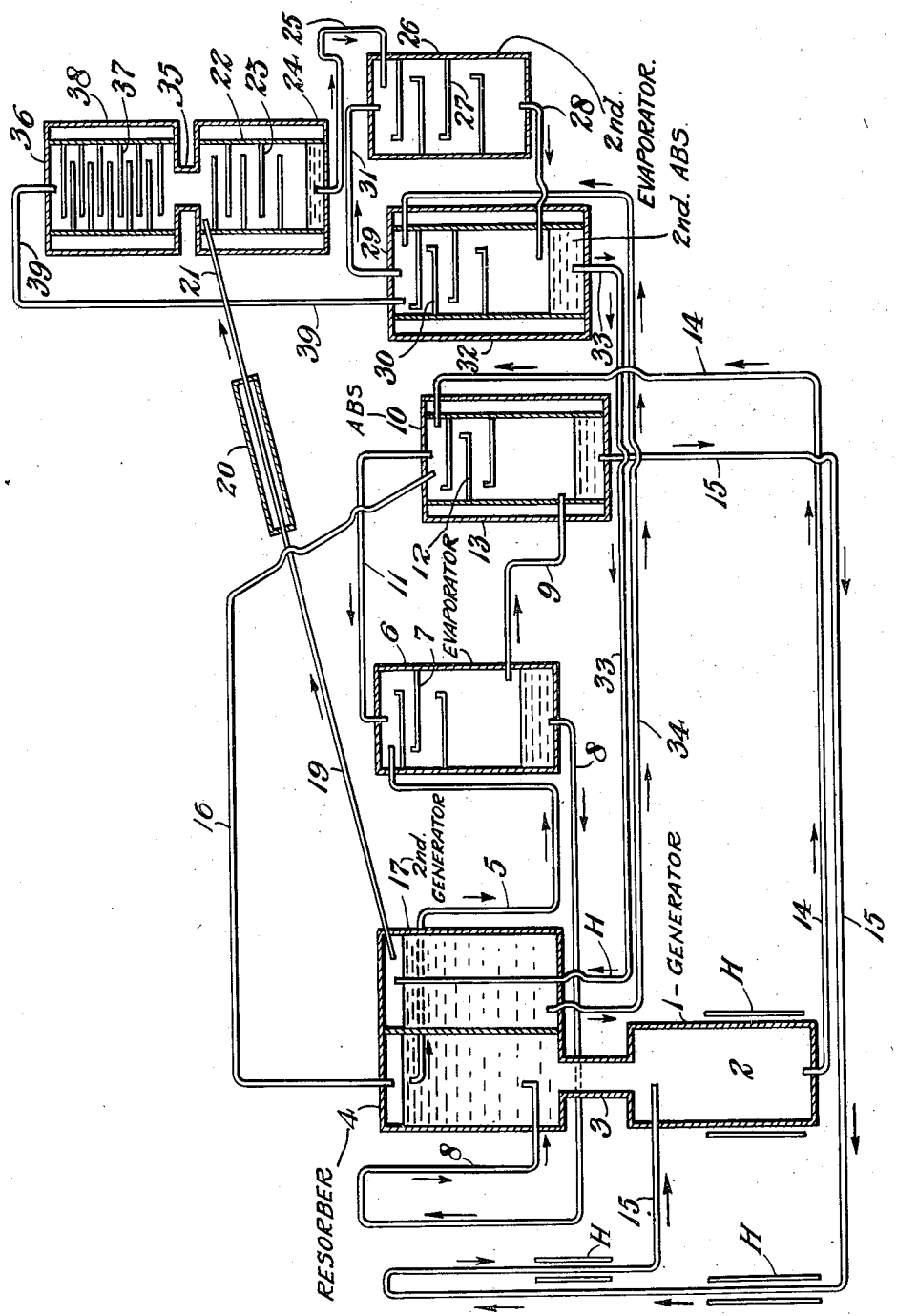

2,283,213

UNITED STATES PATENT OFFICE 2,283,213

REFRIGERATING SYSTEM

Abram Katzow, Indianapolis, Ind.

Application June 17, 1939, Serial No. 279,669

7 Claims. (Cl. 62—119.5)

This application relates to a method and apparatus for producing refrigeration, more specifically to an absorption refrigerating system of the type in which refrigerant is evaporated in the presence of an inert gas.

Among the objects of my invention are to increase the efficiency of a refrigerating system of the aforesaid type and to minimize the effect of condenser-temperature upon evaporator temperature.

Absorption machines are known in which heat evolved when evaporated refrigerant is absorbed into absorption liquid at a relatively low pressure is utilized to expel a refrigerant from a solution of refrigerant and absorbent at a higher pressure. Refrigerators of this kind cannot be used for domestic purposes where low temperatures are required, as pressure of refrigerant in the evaporator can't be lowered without lowering the pressure and the concentrations of refrigerant in the absorbers.

In carrying out my invention, I increase the efficiency by utilizing the heat evolved from absorption of refrigerant at a relatively high pressure to expel a refrigerant from a weaker solution and lower pressure. Preferably this is done by using two generators and one or two reabsorbers with one generator and one reabsorber arranged in heat-exchanging relationship so that the heat taken up in the generator and evolved in the reabsorber may be used to expel a refrigerant from a solution in the associated generator. To minimize the effect of condenser temperature upon evaporator temperature, I provide a chamber and conduits connecting the vapor-space in the condenser with the body of vapor contained in the evaporator and absorber. This chamber and conduits provide for storage and transfer of the inert gas between the chamber on the one hand and the evaporator and absorber on the other hand; and such transfer, as will be explained more fully hereinafter, tends to reduce the effect of changes in condenser temperature upon the temperature of the evaporator.

Further objects, novel features and advantages of the invention will be apparent as the description proceeds which is presented with reference to the accompanying drawing in which reference character 1 designates a generator, heated by any suitable means, contains, as indicated at 2, a solution of refrigerant in a suitable absorbent. The generator is connected to a reabsorber 4 by means of a pipe 3. The reabsorber may be provided with series of baffling plates to facilitate absorption of refrigerant into absorption liquid. Refrigerant boiled off from the solution in the generator 1, absorbed into absorption liquid in the reabsorber 4 passes through a conduit 5 into an evaporator 6. Conveniently, the conduit 5 discharges the solution near the top of the evaporator 6 which is provided with a series of baffle plates 7 arranged to provide a large liquid surface within the evaporator. Conduit 8 connects the lower part of the evaporator 6 with the lower part of the reabsorber 4, a portion of this conduit is arranged at a level somewhat higher than that of the liquid in the reabsorber. Evaporator 6 is connected through conduits 9 and 11 to an absorber 10. The absorber 10 is provided interiorly with a series of baffles 12 and exteriorly with series of heat-radiating fins 13 so that it may be cooled by atmospheric air. The lower part of the generator 1 is connected to the upper part of the absorber 10 by means of a conduit 14 through which absorption liquid passes by gravity from the generator 1 into the absorber 10. A pressure equalizing conduit 16 interconnects the vapor space of the reabsorber 4 with the vapor space of the absorber 10. The lower part of the absorber 10 is connected to the upper part of the generator 1 by means of a conduit 15. This conduit includes an intermediate loop which extends upwardly to a point above the liquid level within the reabsorber 4. Disposed in heat-exchanging relationship with the reabsorber 4 is a supplemental generator 17 containing, as indicated at 18, a solution of refrigerant in absorption liquid. The generator 17 communicates with a rectifier 20 by means of a conduit 19. The upper part of the rectifier 20 communicates with a condenser 22 by means of a conduit 21, which is provided interiorly with baffles 23 and exteriorly with heat radiating fins 24. Refrigerant condensed in the condenser 22 is discharged by gravity through a conduit 25 into the upper portion of an evaporator 26 which is provided with a series of baffle plates 27 arranged to provide a large liquid surface within the evaporator. Evaporator 26 is connected through conduits 28 and 31 to an absorber 29. The absorber 29 is provided interiorly with a series of baffles 30 and exteriorly with heat-radiating fins 32 so that it may be cooled by atmospheric air. The lower part of the absorber 29 is connected to the generator 17 by means of a conduit 33. The lower part of the generator 17 is connected to the upper part of the absorber 29 by means of a conduit 34. Desirably, a portion of the conduit 14 is arranged in heat-exchanging relationship with a portion of the conduit 15. Similarly, a portion of the conduit 33 may be arranged in heat exchange relationship with a portion of the conduit 34. The upper part of the condenser 22 communicates with a lower part of a gas chamber 36 by means of a conduit 35. The chamber is provided interiorly with baffles 37 and exteriorly with heat-radiating fins 38. Conduit 39 interconnects the gaseous spaces of the chamber 36 and the absorber 29.

Various substances may be used as refrigerant and absorbent in practicing my invention. As an example for purposes of illustration I may use ammonia as the refrigerant, water as the absorbent, and hydrogen as an inert gas.

The operation of the invention is as follows:

Heat applied to the generator 1 expels ammonia from the solution 2 and forces it to pass upwardly through the pipe 3 into the reabsorber 4 where the ammonia is absorbed by absorption liquid supplied thereto from the evaporator 6. The absorption liquid enters the reabsorber through the conduit 8. The absorption liquid passing into reabsorber 4 consists of ammonia dissolved in water the amount of which is small compared to the amount of ammonia dissolved in the water passing by gravity from the reabsorber 4 through the conduit 5 to the evaporator 6. To cause a flow of liquid from the evaporator 6 to the reabsorber 4, heat transmitted through a portion of conduit 8 causes formation of vapor there in, this lightens the upwardly extending column of liquid within the conduit 8 so that this column becomes lighter than the column of liquid measured by the height of liquid in the evaporator and thus liquid passes upwardly through the conduit 8 into the reabsorber 4. This supply of liquid provides a higher level of liquid in the reabsorber than in the evaporator and liquid flows by gravity from the reabsorber 4 through the conduit 5 into the evaporator 6. Conduits 5 and 8 form a temperature exchanger. In the evaporator 6 ammonia contained in solution diffuses into hydrogen while passing to gaseous form, as a result of which heat is taken up from the object to be cooled. The evaporator contains a series of baffles 7 for distributing liquid and for obtaining a large surface of gas and liquid contact. The gas mixture formed in the evaporator passes out through the conduit 9 into the absorber 10. In the absorber 10 the gas mixture comes into contact with absorption liquid supplied thereto from the generator 1 through the conduit 14, the result of which is absorption of ammonia into water and liberation of hydrogen. Since hydrogen is lighter than the mixture of ammonia and hydrogen, the hydrogen passes upwardly through the conduit 11 into the evaporator 6 where it is again mixed with ammonia gas. Absorption liquid saturated with ammonia is carried from the absorber through the conduit 15 into the generator 1, due to influence of heat applied to a portion of conduit 15. Some of the inert gas entrapped into the solution is driven out in the generator. This inert gas passes upwardly into the upper part of the reabsorber 4. To provide the same total pressure of gases in the absorber as in the upper part of reabsorber 4, conduit 16 provides for transfer of inert gas between the reabsorber and the absorber 10. The heat of absorption given out in the absorber 10 is carried off by the action of fins 13 or other cooling medium employed. The heat added to refrigerant in the generator 1 and then given off by the refrigerant in the reabsorber 4, however, is delivered to the generator 17 and tends to raise the temperature of such generator and of liquid contained therein. Owing to a relatively high pressure at which ammonia vapor gives off heat while entering the solution in the reabsorber 4 the temperature is raised to a point at which a refrigerant is expelled from a weaker solution in the generator 17. Ammonia expelled from the solution 18 within the generator 17, after passing through the rectifier 20, is condensed in the condenser 22 and conducted to the evaporator 26, where liquid ammonia evaporates in presence of inert gas while extracting heat from the body to be cooled. From the evaporator 26 the gaseous mixture passes through the conduit 28 into the absorber 29 where ammonia is absorbed into water while the inert gas is liberated. Since hydrogen is lighter than the mixture of ammonia and hydrogen, the hydrogen passes upwardly through the conduit 30 into the evaporator 26 where it is again mixed with ammonia gas. Absorption liquid saturated with ammonia is carried from the absorber 29 through the conduit 33 into the generator 17 due to influence of heat applied to a portion of conduit 33. The heat of absorption given out in the absorber 29 is carried off by the action of fins 32 or other cooling medium employed. Absorption liquid is supplied to the absorber 29 through the conduit 34 from the generator 17.

The neutral gas in my apparatus is not confined to the evaporator and absorber. Should condenser-temperature drop to cause a drop in pressure, pressure throughout the system would be equalized by gas-flow through the conduit 39 into the gas chamber 36. As a result, some of the inert gas in the evaporator and absorber will be transferred to the gas chamber; and the partial pressure of the inert gas within the evaporator will therefore be lower than it otherwise would be, the partial pressure of the gaseous refrigerant within the evaporator will be higher than it otherwise would be, and evaporator temperature will be less responsive to condenser temperature.

As soon as the apparatus is placed in operation, gaseous refrigerant entering the condenser from the generator, will displace the mixture of neutral gas and refrigerant, which from the condenser 22 will enter the gas chamber 36 through the conduit 35. The partial pressure of refrigerant throughout the gas chamber and conduit 39 will vary with its concentration; and as a result of this pressure-gradient some of the gaseous refrigerant will diffuse through the neutral gas present in the gas chamber and conduit 39 and into the absorber. The quantity of refrigerant thus reaching the absorber will depend upon the length and cross-sectional area of the conduit 39, which may be made long enough and small enough to prevent loss of an undue proportion of refrigerant. As a result of the above factors, the partial pressure of the ammonia near the bottom of the gas chamber will be materially higher than in the absorber 29, further, the baffles 37 within the chamber 36 serve to condense ammonia vapor which may enter the chamber and serve to retard diffusion. Thus where the inert gas is lighter than the refrigerant, as it is in the assumed case when the inert gas is hydrogen and the refrigerant ammonia the conduit 35 may be connected to the gas chamber near the bottom thereof, and the conduit 39 near the top, all as shown in the drawing.

The sum of heat units expelled from the refrigerant in the reabsorber 4 is about the same as the sum of heat units added to expel the refrigerant from the solution in the generator 1, and since the pressure of refrigerant in the generator 17 is lower than that in the reabsorber 4 less heat units are required to expel one pound of ammonia from the solution in the generator 17 than one pound of ammonia vapor gives off in absorption, in the reabsorber.

Temperature of solution in the reabsorber 4 may be 210°, concentration 50% ammonia and pressure somewhat higher than 390 pounds per sq. inch. At the same time in other parts of the system temperatures concentrations and pressures may be as follows: In the evaporator 6 the pressure of refrigerant 12 pounds, the concentration 50% ammonia and temperature 18°; In the absorber 10 the temperature 110° the concentration about 20% ammonia and the pressure about 12 pounds; In the generator 17 the temperature 200°, concentration 40% ammonia and pressure about 215 pounds per sq. inch; in the condenser the temperature somewhat higher than 100°, pressure about 215 pounds, concentration about 100% ammonia; In the evaporator 26 temperature 18°, pressure about 45 pounds; In the absorber 29 the temperature 100°, the concentration of ammonia 40% and the pressure about 45 pounds.

Having thus described my invention what I claim is:

1. Improvement in the art of refrigeration including two chambers arranged in heat exchange relationship with each other, absorbing a gaseous refrigerant into an absorbent at a relatively high pressure in one chamber and with heat evolved expelling a refrigerant from a solution at a lower pressure in the other chamber.

2. Improvement in the art of refrigeration including two chambers arranged in heat exchange relationship with each other, continuously absorbing a refrigerant under approximately constant pressure into an absorbent to a relatively strong solution in one chamber and with heat evolved expelling a refrigerant from a weaker solution in the other chamber.

3. A method of refrigerating through the agency of an absorption system which includes evaporating a refrigerant from a strong solution of refrigerant and absorbent while removing heat from a body to be cooled, absorbing the gaseous refrigerant into an absorption liquid while giving off heat to a cooling medium, while adding heat expelling the refrigerant from the absorption liquid, absorbing the refrigerant into the first mentioned absorbent while it gives off heat, utilizing this heat to expel a refrigerant from a weaker solution of refrigerant and absorbent, condensing and evaporating the last mentioned refrigerant to product refrigeration.

4. A method of refrigerating through the agency of an absorption system which includes evaporating a refrigerant from a strong solution of refrigerant and absorbent while removing heat from a body to be cooled, absorbing the gaseous refrigerant into an absorption liquid while giving off heat to a cooling medium, while adding heat expelling the refrigerant from the absorption liquid, absorbing this refrigerant into the first mentioned absorbent at a relatively high pressure and utilizing the heat given off to expel a refrigerant at a lower pressure from a solution of refrigerant and absorption liquid, condensing and evaporating the last mentioned refrigerant while producing refrigeration.

5. An improvement in the art of refrigeration which comprises continuously adding heat to a refrigerant dissolved in an absorbent whereby to expel such refrigerant from the absorbent, and causing the expelled refrigerant continuously to give up to a second refrigerant at least a portion of the heat added to it to expel it from the absorbent.

6. In a resorption process of producing refrigeration wherein a solution of refrigerant in absorbent is circulated between an evaporator and a resorber, the steps of adding heat to a refrigerant dissolved in an absorbent whereby to expel such refrigerant from the absorbent, dissolving such expelled refrigerant in the solution in the resorber, and adding to a second refrigerant heat given off by the refrigerant dissolving in the resorber.

7. In resorption refrigerating apparatus, a primary generator containing a solution of refrigerant in an absorbent, means for heating said primary generator to expel refrigerant from the absorbent therein, a resorber containing a solution of refrigerant in absorbent to be strengthened by the refrigerant expelled from said primary generator, and a secondary generator in heat-exchanging relationship with said resorber and containing a solution of refrigerant in absorbent.

ABRAM KATZOW.